(12) United States Patent
Oyman

(10) Patent No.: US 9,419,973 B2
(45) Date of Patent: Aug. 16, 2016

(54) CONTENT URL AUTHENTICATION FOR DASH

(71) Applicant: INTEL IP CORPORATION, Santa Clara, CA (US)

(72) Inventor: Ozgur Oyman, San Jose, CA (US)

(73) Assignee: INTEL IP CORPORATION, Santa Clara, CA (US)

(*) Notice: Subject to any disclaimer, the term of this patent is extended or adjusted under 35 U.S.C. 154(b) by 0 days.

(21) Appl. No.: 14/653,451

(22) PCT Filed: Dec. 20, 2013

(86) PCT No.: PCT/US2013/076837
§ 371 (c)(1),
(2) Date: Jun. 18, 2015

(87) PCT Pub. No.: WO2014/113183
PCT Pub. Date: Jul. 24, 2014

(65) Prior Publication Data
US 2015/0350205 A1    Dec. 3, 2015

Related U.S. Application Data

(60) Provisional application No. 61/753,914, filed on Jan. 17, 2013, provisional application No. 61/824,338, filed on May 16, 2013.

(51) Int. Cl.
*H04L 29/06* (2006.01)
*H04W 12/10* (2009.01)
*H04L 29/08* (2006.01)

(52) U.S. Cl.
CPC .......... *H04L 63/0876* (2013.01); *H04L 63/126* (2013.01); *H04L 65/4076* (2013.01); *H04L 65/4084* (2013.01); *H04L 65/602* (2013.01); *H04L 67/02* (2013.01); *H04W 12/10* (2013.01); *H04L 63/1483* (2013.01)

(58) Field of Classification Search
CPC .................................................. H04L 63/0876
USPC ........................................................... 726/7
See application file for complete search history.

(56) References Cited

U.S. PATENT DOCUMENTS

| 8,924,582 | B2* | 12/2014 | Giladi | H04L 67/108 375/240.02 |
| 2014/0019635 | A1* | 1/2014 | Reznik | H04L 65/607 709/231 |
| 2014/0101445 | A1* | 4/2014 | Giladi | H04L 9/0637 713/168 |

* cited by examiner

*Primary Examiner* — Longbit Chai
(74) *Attorney, Agent, or Firm* — Thorpe North & Western LLP

(57) ABSTRACT

Technology for content uniform resource locator (URL) authentication for dynamic adaptive streaming over hypertext transfer protocol (HTTP) (DASH) is disclosed. In an example, a client device can include computer circuitry configured to: Receive a URL authentication key indicator and a content URL signature indicator from a server; generate a calculated URL signature for a URL in a DASH media presentation description (MPD) from the URL authentication key indicator; request the DASH segment when the calculated URL signature matches the received content URL signature, thereby authenticating content URL; and receive a DASH segment using the authenticated content URL. The received content URL signature is derived at the server from the content URL contained within the DASH segment URL.

27 Claims, 9 Drawing Sheets

```xml
<?xml version="1.0" encoding="UTF-8"?>
<xs:schema targetNamespace="urn:mpeg:dash:schema:sea:2013"
   attributeFormDefault="unqualified"
   elementFormDefault="qualified" xmlns:xs="http://www.w3.org/2001/XMLSchema"
   xmlns="urn:mpeg:dash:schema:sea:2013" xmlns:dash="urn:mpeg:dash:schema:mpd:2011">

<!--URL Authenticity signaling -->

<xs:complexType name="URLAuthenticity">
      <xs:attribute name="keyUriTemplate" type="xs:anyURI" use="required"/>
      <xs:attribute name="authSchemeIdUri" type="xs:anyURI" use="required"/>
      <xs:attribute name="authUrlTemplate" type="xs:anyURI" use="required"/>
      <xs:attribute name="authTagLength" type="xs:unsignedInt"/>
      <xs:attribute name="validityExpires" type="xs:dateTime" use="required"/>
      <xs:attribute name="inbandAuthTag" type="xs:boolean"/>
   </xs:complexType>
</xs:schema>
```

FIG. 5
(Table 2)

CONTENT URL AUTHENTICATION FOR DASH

RELATED APPLICATIONS

This application is a 371 U.S. Nationalization of Patent Cooperation Treaty Application PCT/US13/76837, filed Dec. 20, 2013, which claims the benefit of U.S. Provisional Patent Application Ser. No. 61/824,338, filed May 16, 2013, and U.S. Provisional Patent Application Ser. No. 61/753,914, filed Jan. 17, 2013, each of which are incorporated herein by reference in their entirety.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

The wireless device can be used receive multimedia delivery of Internet video using various protocols, such as hypertext transfer protocol (HTTP) streaming. A protocol to provide HTTP-based delivery of video streaming can include dynamic adaptive streaming over HTTP (DASH).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 5 (i.e., Table 2) illustrates a table of extensible markup language-syntax (XML-syntax) of common group and representation of attributes and elements in accordance with an example;

Figure 1:
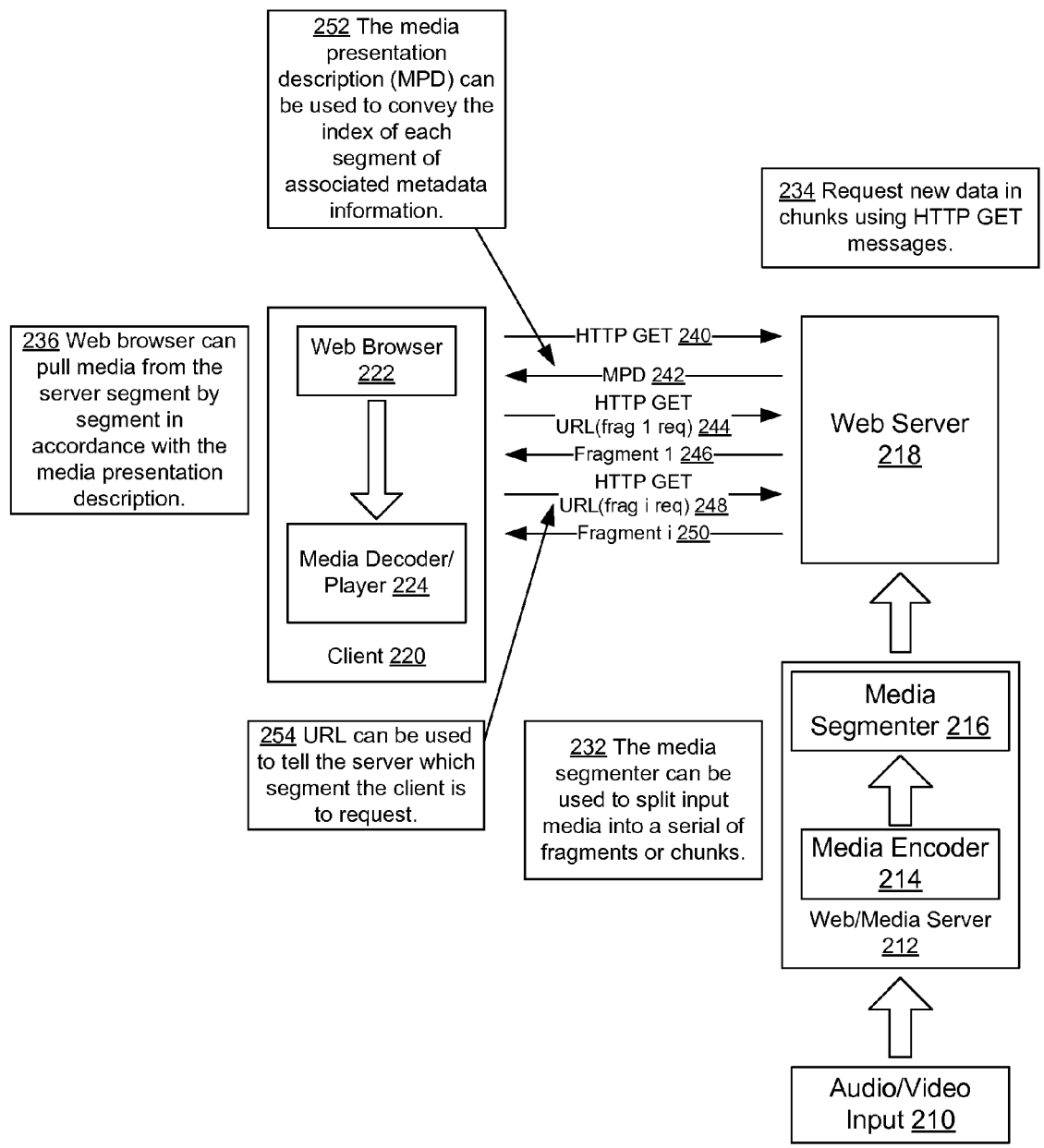
FIG. 1 illustrates a block diagram at a client and servers for dynamic adaptive streaming over hypertext transfer protocol (HTTP) (DASH) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Hypertext transfer protocol (HTTP) streaming can be used as a form of multimedia delivery of Internet video. In HTTP streaming, a multimedia file can be partitioned into one or more segments and delivered to a client using the HTTP protocol. HTTP-based delivery can provide reliability and deployment simplicity due to a broad adoption of both HTTP and HTTP's underlying protocols, including transmission control protocol (TCP)/internet protocol (IP). HTTP-based delivery can enable easy and effortless streaming services by avoiding network address translation (NAT) and firewall traversal issues. HTTP-based delivery or streaming can also provide the ability to use standard HTTP servers and caches instead of specialized streaming servers. HTTP-based delivery can provide scalability due to minimal or reduced state information on a server side. Examples of HTTP streaming technologies can include Microsoft IIS Smooth Streaming, Apple HTTP Live Streaming, and Adobe HTTP Dynamic Streaming.

Dynamic adaptive streaming over HTTP (DASH) can be a standardized HTTP streaming protocol. In DASH, a media presentation description (MPD) metadata file can provide information on the structure and different versions of the media content representations stored in the server including different bitrates, frame rates, resolutions, or codec types. In addition, DASH can also specify segment formats. The MPD metadata file can contain information on the initialization and media segments for a media player (e.g., the media player can look at initialization segment to determine a container format and media timing information) to ensure mapping of segments into a media presentation timeline for switching and synchronous presentation with other representations. Based on this MPD metadata information that describes the relation of the segments in forming a media presentation, clients (or client devices) can request the segments using HTTP GET or partial GET methods. The client can fully control the streaming session. For example, the client can manage an on-time request and smooth playout of the sequence of segments, and potentially adjusting bitrates or other attributes (e.g., to react to changes of the device state or the user preferences). DASH technology has also been standardized by other organizations, such as the Moving Picture Experts Group (MPEG), Open IPTV Forum (OIPF), and Hybrid Broadcast Broadband TV (HbbTV).

A DASH client can receive multimedia content by downloading the segments through a series of HTTP request-response transactions. DASH can provide the ability to dynamically switch between different bit rate representations of the media content as the available bandwidth changes. Thus, DASH can allow for fast adaptation to changing network and wireless link conditions, user preferences and device capabilities, such as display resolution, the type of central processing unit (CPU) employed, or memory resources available, and so forth.

In DASH, a media presentation description (MPD) metadata file can provide information on the structure and different versions of the media content representations stored in a web/media server 212, as illustrated in FIG. 1. The different versions of the media content representations can include different bitrates, frame rates, resolutions, codec types, or other similar types of information. In addition, DASH can also specify the segment formats, which can contain information on initialization and media segments for a media engine to ensure mapping of segments into a media presentation timeline for switching and synchronous presentation with other representations. Based on the MPD metadata information, which describes the relationship of the segments and how the segments form a media presentation, a client 220 can request the segments using an HTTP GET 240 message or a series of partial GET messages. The client can control the streaming session, such as managing an on-time request and smooth playout of a sequence of segments, or potentially adjusting bitrates or other attributes, to react to changes of a device state or a user preference.

FIG. 1 illustrates a DASH-based streaming framework. A media encoder 214 in the web/media server 212 can encode an input media from an audio/video input 210 into a format for storage or streaming. A media segmenter 216 can be used to split the input media into a serial of fragments or chunks 232, which can be provided to a web server 218. The client 220 can request new data in chunks using HTTP GET messages 234 sent to the web server (e.g., HTTP server).

For example, a web browser 222 of the client 220 can request multimedia content using a HTTP GET message 240. The web server 218 can provide the client with a MPD 242 for the multimedia content. The MPD can be used to convey the index of each segment and the segment's corresponding locations, as shown in the associated metadata information 252. The web browser can pull media from the server segment by segment in accordance with the MPD 242 as shown in 236. For instance, the web browser can request a first fragment using a HTTP GET URL(frag 1 req) 244. A uniform resource locator (URL) or universal resource locator can be used to tell the web server which segment the client is to request 254. The web server can provide the first fragment (i.e., fragment 1 246). For subsequent fragments, the web browser can request a fragment i using a HTTP GET URL(frag i req) 248, where i is an integer index of the fragment. As a result, the web server can provide a fragment i 250. The fragments can be presented to the client via a media decoder/player 224.

Figure 2:
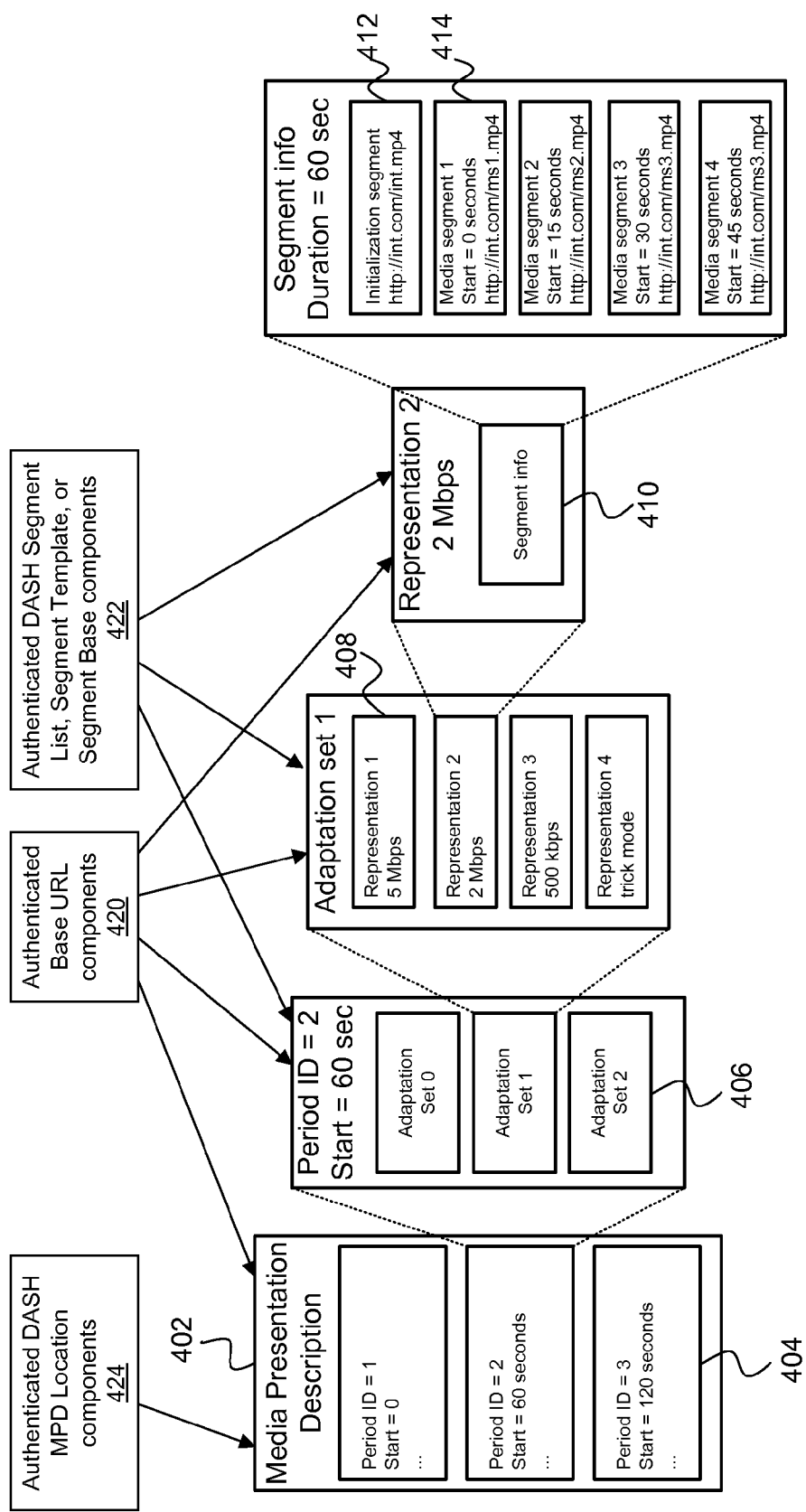
FIG. 2 illustrates a block diagram of a media presentation description (MPD) metadata file configuration in accordance with an example.

As illustrated in FIG. 2, DASH can specify different formats for a media presentation description (MPD) metadata file 402 that provides information on the structure and different versions of the media content representations stored in the server as well as the segment formats. In DASH, a media presentation description (MPD) metadata 402 can provide information on the structure and different versions of the media content representations stored in a web/media server. In the example illustrated in FIG. 2, the MPD metadata can be temporally divided into periods 404 having a predetermined length, such as 60 seconds in this example. Each period can include a plurality of adaptation sets 406. Each adaptation set can provide information about one or more media components with a number of encoded alternatives. For example, adaptation set 0 in this example might include a variety of differently encoded audio alternatives, such as different bit rates, mono, stereo, surround sound, and so forth. In addition to offering different quality audio for a multimedia presentation over the period ID, the adaptation set may also include audio in different languages. The different alternatives offered in the adaptation set are referred to as representations 408.

In FIG. 2, Adaptation set 1 is illustrated as offering video at different bitrates, such as 5 mega-bits per second (Mbps), 2 Mbps, 500 kilo-bits per second (kbps), or a trick mode. The trick mode can be used for seeking, fast forwarding, rewinding, or other changes in location in the multimedia streaming file. In addition, the video may also be available in different formats, such as two dimensional (2D) or three dimensional (3D) video, or portrait or landscape oriented video. Each representation 408 can include segment information 410. The segment information can include initialization information 412 and the actual media segment data 414. In this example, an MPEG-4 (MP4) file is streamed from a server to a mobile device. While MP4 is used in this example, a wide variety of different codecs may be used. A codec is a device, application, element, or computer program capable of encoding or decoding a digital data stream or signal.

The multimedia in the adaptation set can be further divided into smaller segments. In the example of FIG. 2, the 60 second video segment of adaptation set 1 is further divided into four sub-segments 414 of 15 seconds each. These examples are not intended to be limiting. The actual length of the adaptation set and each media segment or sub-segment is dependent on the type of media, system requirements, potential types of interference, and so forth. The actual media segments or sub-segments may have a length that is less than one second to several minutes long.

The DASH standard can include a segment authentication framework allowing use of digital signatures or digests for DASH segment types in order to verify the origin and content authenticity. Signatures (or digests) may be provided for media segments or media sub-segments, as well as for initialization, index, and bitstream switching segments. As used herein, the term signature and digest may be used interchangeably for the same feature or element. The segment authentication framework can calculate a signature of an unencrypted segment, and store the value externally. An MPD interface can provide URL templates to retrieve the signatures, using HTTP or secure HTTP (HTTPS). HTTPS is a communications protocol for secure communication over a computer network, with especially wide deployment on the Internet. The client can retrieve the signature, and then calculate the signature locally on an unencrypted media segment or subsegment using a validation key, and can reject the media segment or subsegment in case of a mismatch between the retrieved signature and the calculated signature. Rejected media segment or subsegment may not be viewed or played at the client device.

In an example, the signatures can be calculated from a hashing function using authentication or validation keys combined with the URL for the media segment or subsegment. The keys may be provided by a server or a trusted entity.

Segment authentication can be independent of a content protection scheme, and may be used on unencrypted segment, as well as on encrypted segments encrypted using a digital rights management (DRM) system. For example, a content authentication descriptor (e.g., ContentAuthentication) can be used in the MPD to declare the authentication framework and communicate the signature URLs. Multiple content authentication schemes can be used. For instance, two schemes can be specified in the DASH standard for content authentication including the SHA-256 digest, identified by the uniform resource name (URN) "urn:mpeg:dash:sea:sha256", and the HMAC-SHA1 signature, identified by "urn:mpeg:dash:sea:hmac-sha1". The keyed-hash message authentication code (HMAC) is a specific construction for calculating a message authentication code (MAC) involving a cryptographic hash function in combination with a secret cryptographic key. SHA-1 (or SHA1) is a cryptographic hash function designed by the United States National Security Agency (NSA) and published by the United States National Institute of Standards and Technology (NIST) as a U.S. Federal Information Processing Standard. Moreover, a content digest element (e.g., ContentDigest) can provide a template for constructing a URL, which can be further used for downloading a signature for a specified media segment or subsegment. Similarly, a content signature element (e.g., ContentSignature) can provide a URL for key acquisition and a template for constructing a URL (or URI), which can be further used for downloading the signature for a specified media segment or subsegment. A uniform resource identifier (URI) can include a URL or URN.

The DASH standard can define methods to authenticate DASH segments. As provided herein, DASH can provide technology (e.g., servers, client devices or terminals, user equipments (UEs), methods, computer circuitry, systems, mechanisms, processes, or procedures) to authenticate the URLs in the MPD. Without content URL authentication and if the URL mapping of a desired DASH segments in the MPD is incorrect, the user may receive an unexpected data stream. Incorrect mappings may be introduced through various elements in the content distribution system used to deliver the content from the content source to the end user. For instance, one situation to introduce incorrect URL mappings may arise when a list of URLs is compiled by a reseller. A content provider may provide DASH content generation and delivery services to resellers of streaming content, such as internet service providers or mobile operators who provide end users access to the DASH content. A service level agreement between a content provider and a reseller can include a provision that commits the content provider to a specified level of content delivery accuracy, as well as penalty provisions if the specified level of accuracy is not achieved. Therefore, binding a URL to the content that it represents can be beneficial, which can ensure that the intended content gets delivered to the users. Technology can be used to validate that the intended content is accessed by the intended client (or user). Communication of validation keys for authentication of URLs through signatures (or digests), which can be indicative of a content source, can allow the DASH client to check the validity of the MPD URLs and ensure the content is received from the expected source. Using the MPD or media segments to signal validation and/or authentication keys, signatures, or digests or their locations (e.g., URLs) can be beneficial for proper content delivery.

Another example for the URL signing capability (or URL authentication) can be for client authentication, which can be used to control access to a specific resource and also identify content as not intended for a certain group of users. Content and service providers, in order to protect their copyright and fulfill their licensing obligations, can restrict access to content and limit viewing times. Client authentication can be used to control access to a specific resource and also identify content as not intended for a certain group of users. For example, authentication keys for certain types of restricted material, such as copyrighted material or pay-per-view content, may be distributed only to authorized users. As another example, rating information (e.g., G, PG, PG-13, TV-14, or R) may be provided for parental control. In such settings, a client-specific authentication key can be delivered to the intended users, and only the users with the correct authentication key information may be allowed to access the content. Player programs, application, or devices can operate with specified modes that allow and/or prohibit play of DASH content as identified by the authentication keys for the content.

A client-specific authentication key may be inserted as a parameter within an access URL by a service platform, which can then be checked by a delivery server before fulfilling the request. The DASH client can insert various authentication parameters in a query part of the media segments URLs, and thereby client-specific URLs may be generated. In another example, the authentication keys to generate media segments URL from the MPD URLs can be delivered to DASH clients via the MPD or via other delivery mechanisms.

For example, URL signatures and/or digests may be generated for the URLs contained in the MPD file. In a configuration, the information on the signatures can be communicated via the MPD file. The signature can be contained in the MPD file, or URLs pointing to these signatures can be contained in the MPD file, or a list or template-based URL construction rules to generate the URLs for these signatures may be contained in the MPD file. Thus, the MPD file can include a signature, a URL pointing to the signature, a list of URL construction rules to generate the URL for the signature, or template-based URL construction rules to generate the URL for the signature.

For instance, an URLAuthentication descriptor may be used in the MPD to declare the authentication framework and communicate the signature URLs. Multiple content authentication schemes can be defined. Moreover, a URLDigest element may provide a template for constructing a URL, which can be further used for downloading the signature for a given URL. Similarly, a URLSignature element can provide a URL for key acquisition and a template for constructing a URL, which can be further used for downloading the signature for a given URL.

Different components of a URL may be authenticated differently. For example, a set of signatures may be included for the base URL (i.e., at the DASH MPD 402, period 404, adaptation set 406, or representation 408 level) for base URL authentication 420, and then the remaining URL components pointing to specific DASH representations and segments may be signed (or authenticated) separately, as shown in FIG. 2. In another example, a set of signatures may be included for the @sourceURL attribute in the SegmentBase element (e.g., DASH segment base) that can contain an absolute URL of a DASH segment for DASH segment base authentication 422. In another example, a set of signatures may be included for the Location element that includes an absolute URL for the MPD for DASH MPD location authentication 424. Authenticating the MPD location and the base URL and communicating the corresponding signatures to the DASH client can be beneficial for content source validation.

For DASH playlists (where each DASH segment is assigned a URL that is contained in the MPD), each playlist-specific URL may be signed or authenticated by signatures (i.e., at the DASH period 404, adaptation set 406, or representation 408 level) for DASH segment list authentication 422. For DASH templates (where URL of each DASH segment is generated by the DASH client by a pre-defined rule), each template-specific URL may be signed or authenticated by signatures (i.e., at the DASH period, adaptation set, or representation level) for DASH segment template authentication 422.

Figure 3:
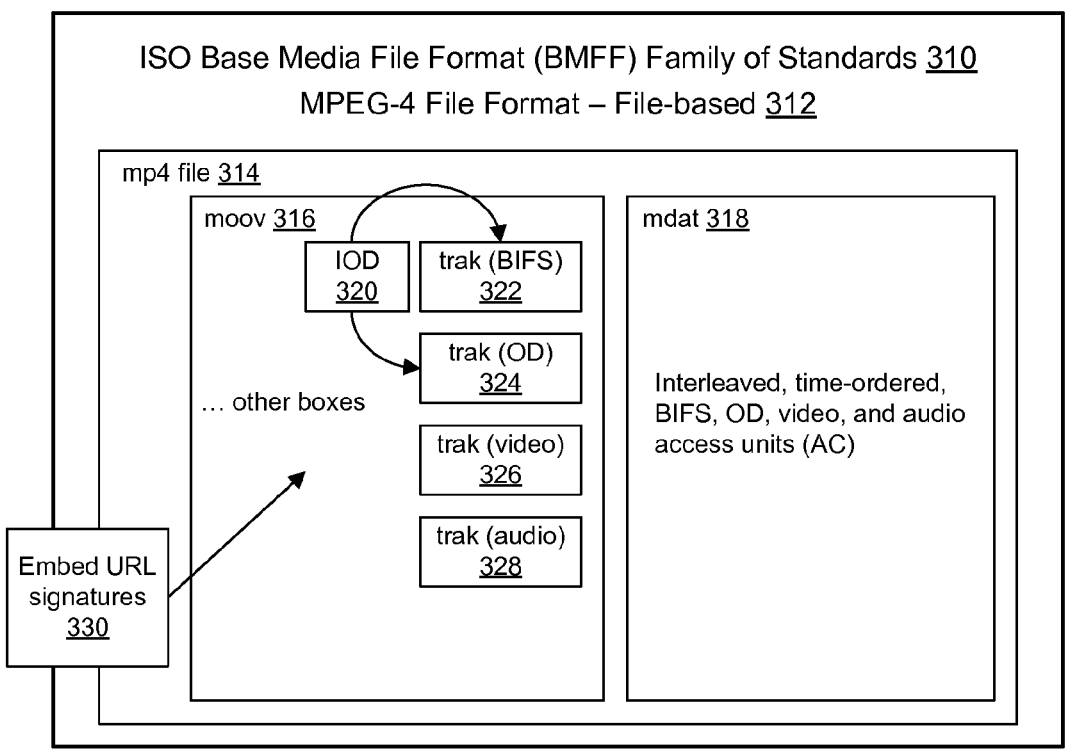
FIG. 3 illustrates an example of a third generation partnership project (3GPP) file format (3GP) file using an instantiation of the International Organization for Standardization-base (ISO-base) media file format (ISO-BMFF) in accordance with an example.

In another configuration, the information on the URL signatures may be carried or embedded within DASH segments instead of the MPD. In an example, the signatures can be carried within a file-level International Organization for Standardization-base media file format (ISO-BMFF) box (e.g., in initialization segment such as in a 'moov' box 316 for ISO-BMFF or in media segments such as in a 'moof' box for ISO-BMFF, as illustrated in FIG. 3). In another configuration, an indicator may be included in the MPD to signal the presence of the embedded information on the signatures within the DASH segments so that the DASH client can prepare to receive the signatures prior to segment reception.

For example, the URL signatures 330 can be embedded in a 3GPP file format (3GP) file (e.g., mp4 file 314 in a moving picture experts group-4 (MPEG-4) file format 312) as an instantiation of an International Organization for Standardization (ISO) Base Media File Format (BMFF) 310 as part of streaming and download applications, as illustrated in FIG. 3. The content file (e.g., mp4 file 314) can include an initialization segment, such as a "moov" box 316, and media data (mdat 318). The moov box can include initial object descriptor (IOD) 320, a Binary Format for Scene (BIFS) trak (or track) 322, an object descriptor (OD) trak, a video trak 326, and an audio trak 328. The embedded URL signatures 330 can be included in the moov box. The mdat can include interleaved, time-ordered, BIFS, OD, video, and audio access units (AC).

Figure 4:
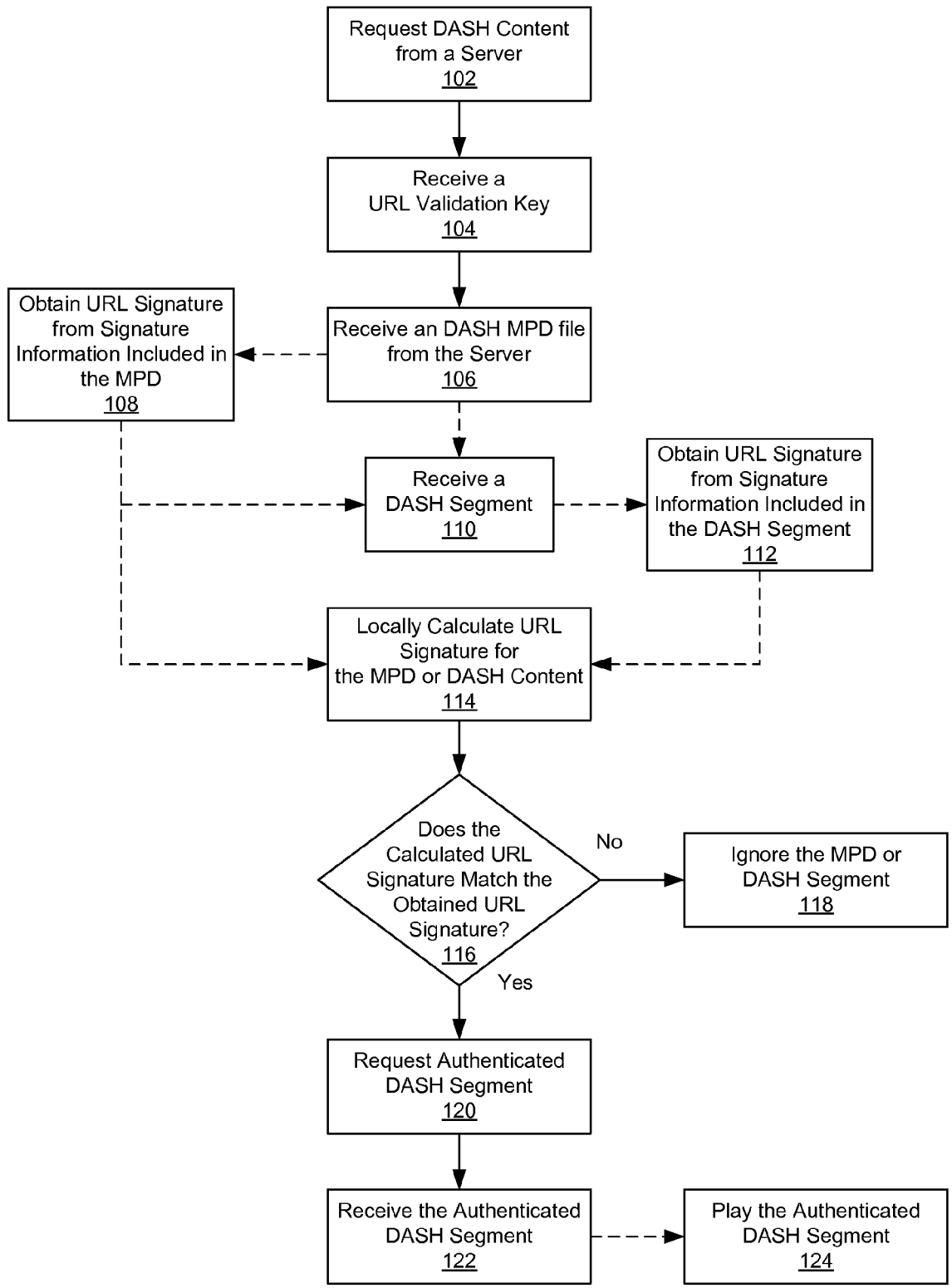
FIG. 4 depicts a flow chart for content uniform resource locator (URL) authentication for dynamic adaptive streaming over hypertext transfer protocol (HTTP) (DASH) at a client device (e.g., UE) in accordance with an example.

FIG. 4 illustrates a flow chart for content URL authentication for a DASH client (e.g., UE). The DASH client can request DASH content from a server 102, such as a web server, a media server, an authentication server, a 3GPP LTE packet switched streaming service (PSS) server, a DASH server, or an integrated multimedia subsystem (IMS) based PSS and multimedia broadcast and multicast service (MBMS) (IMS_PSS_MBMS) server. The DASH client can receive a URL validation key 104 from the server or a trusted entity. In another example, the URL validation key can be received using a same mechanism as the URL signatures. The DASH client can receive a DASH MPD file from the server 106. In an alternative, the MPD file can include signature information, which can include the URL signatures, a URL pointing to the URL signature, a list of URL construction rules to generate the URL for the URL signature, template-based URL construction rules to generate the URL for the URL signature, or an indicator to signal the presence of the embedded information on the URL signatures within the DASH segments. The DASH client can obtain the URL signatures from the signature information 108 based on the type of signature information included in the MPD file. In another alternative, the DASH client can receive a DASH segment from the server 110. The DASH segment can include signature information, which can include the URL signatures, a URL pointing to the URL signature, a list of URL construction rules to generate the URL for the URL signature, or template-based URL construction rules to generate the URL for the URL signature. The DASH client can obtain the URL signatures from the signature information 112 based on the type of signature information included in the DASH segment. The DASH client can locally calculate the URL signatures for the MPD or the DASH content 114 using the URL validation key with the content URL. The calculation the URL signatures can occur before or after obtaining the URL signature from the server. The locally calculated URL signature can be compared with the obtained (or received) URL signature 116. If URL signatures do not match, the MPD file or DASH segment can be ignored (or rejected) 118. If URL signatures match, the MPD file or DASH segment have been validated, so the DASH client can request the authenticated DASH segment from the server 120. The DASH client can receive the authenticated DASH segment from the server 122. Then, the authenticated DASH segment can be played (or presented) 124.

In another example, an authenticity tag URLs may be provided for segment URLs via the MPD file, using an UrlAuthenticity element that declares the authentication framework and communicates the authentication key and signature URLs. The URL authentication can be optional if used with SupplementaryProperty descriptor, and mandatory if used with EssentialProperty descriptor. The value of @schemeIdUri in either EssentialProperty or SupplementalProperty can be "urn:mpeg:dash:sea:urlauth:2013" if the UrlAuthenticity element authentication framework is used.

In another configuration, the UrlAuthenticity element can be implemented in a DASH MPD based on 3GPP technical specification (TS) 26.247 V11.0.0 (2012-09) or defined as an EssentialProperty or SupplementalProperty based on the joint working group International Organization for Standardization (ISO)/International Electrotechnical Commission (IEC) 23009-1:2012, depending on the application. The UrlAuthenticity element can provide a URL for key acquisition and a template for constructing a URL, which can be further used for downloading the authenticity tag for a given MPD segment URL. For instance, the UrlAuthenticity element can be included in the MPD, where the MPD can have common attributes and elements. The semantics of UrlAuthenticity element can be as shown in Table 1. The UrlAuthenticity element can include attributes: @authSchemeIdUri, @authUrlTemplate, @authTagLength, @keyUrlTemplate, @validityExpires, or @inbandAuthTag. Each element or attribute can have an element or attribute name, use, or description. The 'use' column in Table 1 can have an attribute marked with 'M' (mandatory), 'O' (optional), 'OD' (optional with default value), or 'CM' (conditionally mandatory).

TABLE 1

| Element or Attribute Name | Use | Description |
| --- | --- | --- |
| UrlAuthenticity | | Specifies information necessary to compute an authenticity tag for segment URL |
| @authSchemeIdUri | M | Specifies the algorithm used for computing the authenticity tag |
| @authUrlTemplate | M | Specifies the template for creating the URL used for retrieving the authenticity tag value. Can be absent if @inbandAuthTag is true |
| @authTagLength | O | Specifies the length of an authentication tag in bits. If absent, the tag length is same as in the algorithm identified by @authSchemeIdUri |
| @keyUrlTemplate | O | Specifies the template for key URI generation, using syntax and variable substitution as defined in ISO/IEC 23009-1:2012, 5.3.9.4.4. |
| @validityExpires | M | Specifies (in wall clock time) the time when URL authenticity expires |
| @inbandAuthTag | OD | If true, authenticity tag appears within associated segments (in case such in-band carriage is specified) |

Legend:
For attributes: M = Mandatory, O = Optional, OD = Optional with Default Value, CM = Conditionally Mandatory.
For elements: <minOccurs> . . . <maxOccurs> (N = unbounded)
Elements are bold; attributes are non-bold and proceeded with an @.

An example extensible markup language-syntax (XML-syntax) for the UrlAuthenticity element can be as shown in Table 2, illustrated in FIG. 5.

Communication of validation keys for authentication of URLs through signatures indicative of a content source can allow the DASH client to check the validity of the MPD URLs. The DASH client can also receive the content-specific authentication keys for various DASH components (e.g., the DASH period 404, adaptation set 406, or representation 408 (FIG. 2)). This communication or signaling can allow the client to retrieve the URL signatures, and then also calculate URL signatures locally based on the URLs in the received MPD and corresponding authentication key, and reject the corresponding content in case of a mismatch. Such content URL validation information (signatures or authentication keys) or their locations (URLs) may be signaled as part of the MPD or media segments. The framework or process can calculate a signature of a segment URL, and store the value externally along with the signature verification and/or authentication keys. The MPD interface can provide URL templates to retrieve these signatures, using HTTP or HTTPS. The DASH client can retrieve the signatures and authentication keys, then calculate the signatures locally on a given segment URL, and can reject the URL in case of a mismatch.

DASH content URL authentication can have various applications (or use cases). Five use cases can illustrate some of the advantages and benefits of DASH content URL authentication. In a first use case, Alice can have a DASH-capable client application that allows her watch DASH-formatted content. She can be subscribed to Operator BestCoverage Telecom's mobile streaming service. She may be interested in watching a movie, "A Dash through the Clouds", which is available in a DASH format. The operator can restrict access to the movie to authorized users and employ 3GPP-based authentication mechanisms to restrict access (e.g., content URL authentication). Since Alice may already subscribe to the mobile streaming service, her client application can be authenticated and she can enjoy the movie.

In a second use case, Alice and Bob can both have DASH-capable client applications that allow them watch DASH-formatted content. They can both be subscribed to Operator BestCoverage Telecom's mobile streaming service. Bob can pay for a 'premium streaming' plan while Alice can prefer (and pay for) a cheaper 'basic streaming' plan. They can both be interested in watching the movie "A Dash through the Clouds". The movie can be available in DASH format at different bitrates and/or resolutions. Due to Bob's premium plan subscription, Bob's client application can access and receive streams at various bitrates and/or resolutions offered by the service (e.g., by selecting, at a given time, a best resolution given a link bandwidth and device capabilities). Alice's client application may be restricted from accessing the highest bitrates and/or resolutions due to her basic subscription, so Alice's client application using content URL authentication may only receive streams from a limited set of the available bitrates and/or resolutions.

In a third use case, the Operator BestCoverage Telecom (operator) may have recently invested significantly into the operator's infrastructure and may be looking for new business opportunities to increase the operator's service revenues by focusing on the over-the-top (OTT) content distribution value chain. Particularly, the operator may wish to leverage their information systems and network equipment (e.g., home subscriber subsystem (HSS)) that may contain valuable user information including authentication keys, user identities, and user service profiles. Such user information can enable the operator to perform a number of control functions including user authentication, authorization of user access to services, and billing on behalf of content and content distribution network (CDN) providers. The operator may have recently signed a security and/or authentication related service level agreement (SLA) with a DASH content provider, MyDASH, to distribute MyDASH's DASH-formatted content by fulfilling user authentication and authorization on behalf of MyDASH over the operator's 3GPP generic authentication architecture (GAA). MyDASH can host a tiered subscription service and provide enforcement of content-specific access restrictions for client authentication using the content URL authentication.

In a fourth use case, the Operator BestCoverage Telecom (operator) may have recently signed a service level agreement (SLA) with over-the-top (OTT) DASH content provider, MyDASH, to distribute and/or resell MyDASH's DASH-formatted content. The operator can plan to use the DASH-formatted content from MyDASH to offer various new services to the operator's clients. The operator can use DASH content URL authentication to ensure integrity of the content and associated metadata for a consistent user experience. Even though the operator investments can be made to the operator's infrastructure to ensure security, the operator may also use the technology described herein to provision against the potential intrusions to during DASH content delivery from MyDASH. The operator can include a provision that commits MyDASH to a specified level of content delivery accuracy, as well as penalty provisions if the specified level of accuracy is not achieved. In response, MyDASH can enable authentication mechanisms for the operator to validate the integrity of the delivered content and MPD.

In a fifth use case, the Operator BestCoverage Telecom (operator) can sign service level agreements (SLA) with several over-the-top (OTT) DASH content providers to distribute and/or resell the DASH content providers' DASH-formatted content. The operator can use these DASH-formatted contents to offer various new services to the operator's clients. The operator can use DASH content URL authentication to ensure integrity of the content and associated metadata for a consistent user experience. In particular, the operator can employ a service via stream splicing to create media mashups by combining content from multiple sources. For instance, an advertisement insertion, for both video on demand (VoD) and live streams, provides an example of a possible media mashup. Such schemes (e.g., media mashups) can employ dynamic MPD generation or rewriting, but these schemes may not modify or remove segment URLs and other metadata used for content URL authentication. Improper modification of MPD and segment URLs or other metadata may cause playback interruptions, and in a case of unplayed advertisements, improper modification of MPD and segment URLs or other metadata may result in loss of revenue for content providers and the operator.

Figure 6:
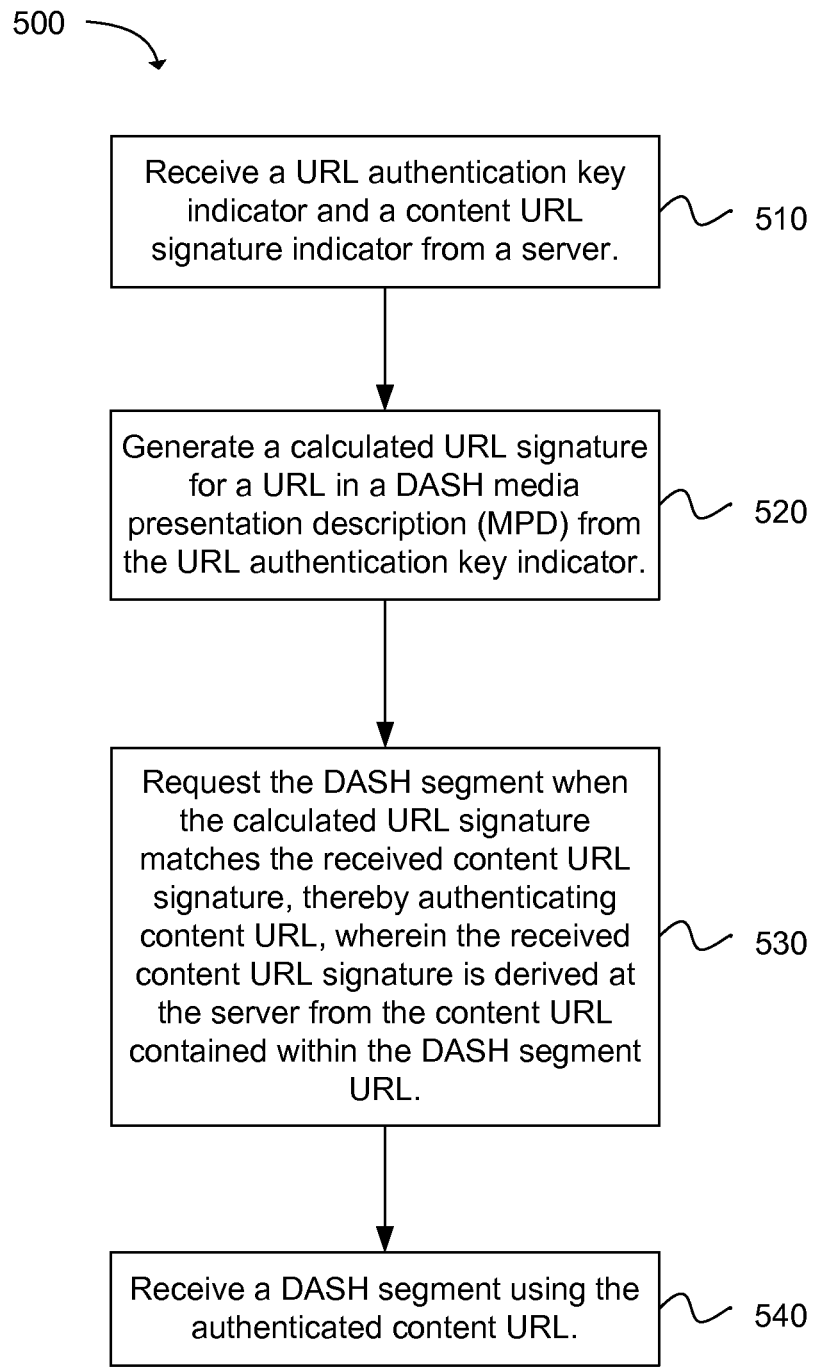
FIG. 6 depicts functionality of computer circuitry of a client device (e.g., UE) operable for content uniform resource locator (URL) authentication for dynamic adaptive streaming over hypertext transfer protocol (HTTP) (DASH), in accordance with an example.

Another example provides functionality 500 of computer circuitry of a client device operable for content uniform resource locator (URL) authentication for dynamic adaptive streaming over hypertext transfer protocol (HTTP) (DASH), as shown in the flow chart in FIG. 6. The functionality may be implemented as a method or the functionality may be executed as instructions on a machine, where the instructions are included on at least one computer readable medium or one non-transitory machine readable storage medium. The computer circuitry can be configured to receive a URL authentication key indicator and a content URL signature indicator from a server, as in block 510. The computer circuitry can be further configured to generate a calculated URL signature for a URL in a DASH media presentation description (MPD) from the URL authentication key indicator, as in block 520. The computer circuitry can also be configured to request the DASH segment when the calculated URL signature matches the received content URL signature, thereby authenticating content URL, wherein the received content URL signature is derived at the server from the content URL contained within the DASH segment URL, as in block 530. The computer circuitry can be further configured to receive a DASH segment using the authenticated content URL, as in block 540.

In an example, the computer circuitry configured to receive the URL authentication key indicator and the content URL signature indicator can be further configured to receive the URL authentication key indicator or the content URL signature indicator via a media presentation description (MPD) metadata file. The URL authentication key indicator can include a URL authentication key, or the content URL signature indicator can include a content URL signature. In another configuration, the URL authentication key indicator can include a pointer key URL that points to the URL authentication key, or the content URL signature indicator can include a pointer signature URL that points to the content URL signature. The computer circuitry can be further configured to: obtain the URL authentication key using the pointer key URL; or obtain the content URL signature using the pointer signature URL.

In another example, the URL authentication key indicator can include a URL construction rule that can provide a template to construct the authentication key URLs, or the content URL signature indicator includes a URL construction rule that can provide a template to construct the URLs for the content URL signatures. The computer circuitry can be further configured to: generate the authentication key URLs using the URL construction rule; or generate the URLs for the content URL signatures using the URL construction rule. In another configuration, a URL Authenticity descriptor can be used to declare an authentication framework via the URL authentication key indicator or the content URL signature indicator. The URL Authenticity descriptor can include a URL Digest element or a URL Signature element. The computer circuitry can be further configured to construct a signature URL using a template from the URL Digest element, and download a content URL signature from the signature URL. Or, the computer circuitry can be further configured to: construct an authentication key URL from the URL Signature element; download a URL authentication key from the authentication key URL; construct a signature URL using a template from the URL Signature element; and download a content URL signature from the signature URL.

In another example, the URL authentication key indicator or the content URL signature indicator can be used to authenticate a base URL for a DASH MPD, period, adaption set, or representation level, or the URL authentication key indicator, or the content URL signature indicator can be used to authenticate a segment URL of the MPD. In another configuration, the URL authentication key indicator or the content URL signature indicator can be used to authenticate a DASH playlist, including a plurality of DASH segment URLs. The URL authentication key indicator or the content URL signature indicator can be used to authenticate each playlist-specific URL in the DASH playlist. In another example, the URL authentication key indicator or the content URL signature indicator can be used to generate a DASH template for a plurality of DASH segment URLs. The URL authentication key indicator or the content URL signature indicator can indicate a predefined rule used to authenticate each template-specific URL.

In another configuration, the computer circuitry configured to receive the URL authentication key indicator and the content URL signature indicator can be further configured to receive a media presentation description (MPD) metadata file including the URL authentication key indicator or the content URL signature indicator. The URL authentication key indicator can indicate that the URL authentication key is embedded in the DASH segment, or the content URL signature indicator can indicate that the content URL signature is embedded in the DASH segment. The computer circuitry configured to receive the DASH segment can be further configured to receive the URL authentication key or the content URL signature within the DASH segment.

In another example, the computer circuitry configured to receive the URL authentication key indicator and the content URL signature indicator can be further configured to receive the URL authentication key indicator or the content URL signature indicator via file-level International Organization for Standardization (ISO) base media file format (ISO-BMFF) file box in the DASH segment. The URL authentication key indicator can include a URL authentication key, or the content URL signature indicator can include a content URL signature. The DASH segment can include an initialization segment or a moov box for the ISO-BMFF, or the DASH segment can include a media segment or a moof box for the ISO-BMFF. The client device can include a mobile terminal (MT), a user equipment (UE), or a mobile station (MS). In another example, the client device can include an antenna, a camera, a touch sensitive display screen, a speaker, a microphone, a graphics processor, an application processor, internal memory, or a non-volatile memory port.

Figure 7:
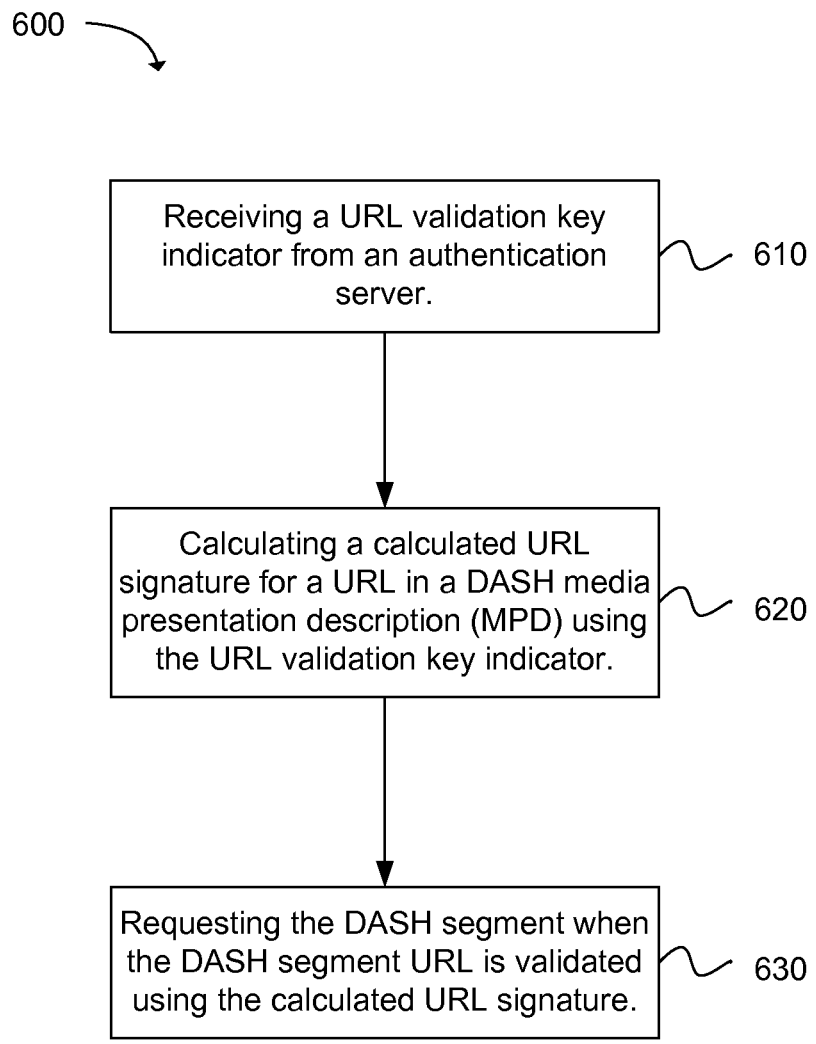
FIG. 7 depicts a flow chart of a method for providing content uniform resource locator (URL) authentication for dynamic adaptive streaming over hypertext transfer protocol (HTTP) (DASH) at a client device in accordance with an example.

Another example provides a method 600 for providing content uniform resource locator (URL) authentication for dynamic adaptive streaming over hypertext transfer protocol (HTTP) (DASH) at a client device, as shown in the flow chart in FIG. 7. The method may be executed as instructions on a machine or computer circuitry, where the instructions are included on at least one computer readable medium or one non-transitory machine readable storage medium. The method includes the operation of receiving a URL validation key indicator from an authentication server, as in block 610. The next operation of the method can be calculating a calculated URL signature for a URL in a DASH media presentation description (MPD) using the URL validation key indicator, as in block 620. The method can further include requesting the DASH segment when the DASH segment URL is validated using the calculated URL signature, as in block 630.

In an example, the operation of receiving the URL validation key indicator can further include receiving the URL validation key indicator via a media presentation description (MPD) metadata file. In a configuration, the URL validation key indicator can include a URL validation key or a content URL signature. The operation of validating the DASH segment URL using the calculated URL signature can further include comparing a server-generated content URL signature with the client device calculated URL signature. In another configuration, the URL validation key indicator can include a pointer key URL that points to the URL validation key or a pointer signature URL that points to the content URL signature. The method can further include: retrieving the URL validation key using the pointer key URL; or retrieving the content URL signature using the pointer signature URL.

In another configuration, the URL validation key indicator can include a URL construction rule that can provide a template to construct the authentication key URLs or a URL construction rule that can provide a template to construct the URLs for the content URL signature. The method can further include: constructing a validation key URLs using the URL construction rule; or constructing the URLs for the content URL signatures using the URL construction rule. The URL validation key indicator can be used to authenticate a base URL for a DASH MPD, period, adaption set, or representation level. Or the URL validation key indicator can be used to authenticate a segment URL of the MPD.

Figure 8:
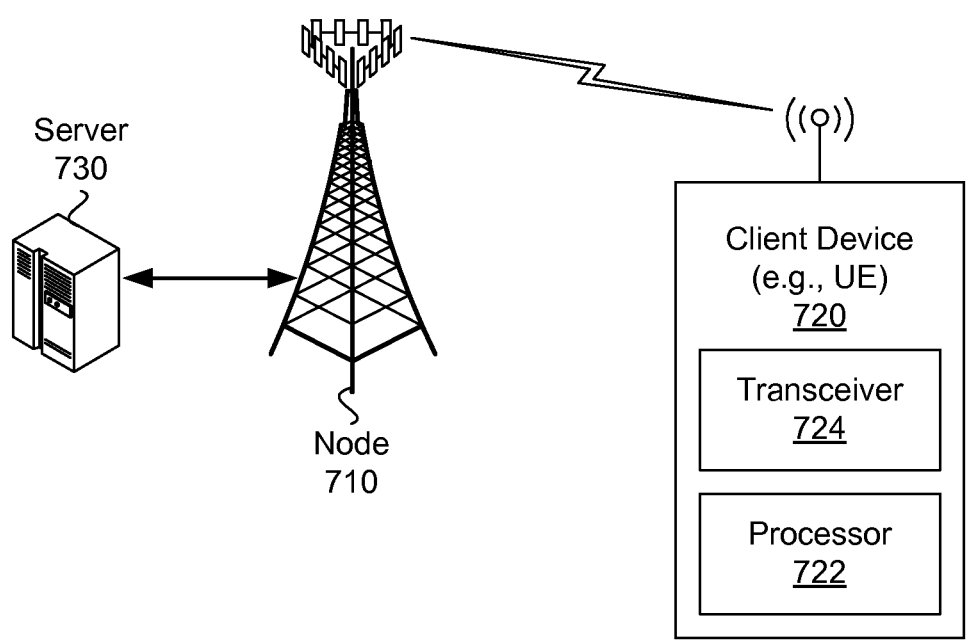
FIG. 8 illustrates a diagram of a server, a node (e.g., eNB), and a user equipment (UE) in accordance with an example.

FIG. 8 illustrates an example client device 720 for providing content URL authentication for DASH, a node 710, and a server 730 for content URL authentication for DASH. The client device can be configured for content URL authentication for DASH, as described in 500 of FIG. 6. In another configuration, the client device can be operable for providing content URL authentication for DASH, as described in 600 of FIG. 7. The client device 720 can include a processor 722 and a transceiver 724. In an example, the client device can communicate with the server via the node. The node 710 can include a base station (BS), a Node B (NB), an evolved Node B (eNB), a baseband unit (BBU), a remote radio head (RRH), a remote radio equipment (RRE), a remote radio unit (RRU), or a central processing module (CPM).

Referring back to FIG. 8, the server 720 can include a processor and a transceiver. The processor can be configured to generate a content URL signature, a URL authentication key indicator, and a content URL signature indicator for a DASH segment URL. The URL authentication key indicator or a content URL signature indicator can be used by a client device to generate a calculated URL signature for the DASH segment URL. The transceiver can be configured to: transmit a URL authentication key indicator and a content URL signature indicator to the client device; receive a URL request from the client device for the DASH segment; and transmit a DASH segment to the client device associated with the URL request.

In an example, the transceiver can be further configured to transmit the URL authentication key indicator and the content URL signature indicator via a media presentation description (MPD) metadata file. The URL authentication key indicator can include a URL authentication key, or the content URL signature indicator can include a content URL signature. In another example, the URL authentication key indicator can include a pointer key URL that points to the URL authentication key, or the content URL signature indicator can include a pointer signature URL that points to the content URL signature. The transceiver can be further configured to: transmit the URL authentication key when the pointer key URL is received; or transmit the content URL signature when the pointer signature URL is received.

In another configuration, the URL authentication key indicator can include a URL construction rule that can provide a template to construct the authentication key URLs. Or the content URL signature indicator includes a URL construction rule that can provide a template to construct the URLs for the content URL signatures. In another example, the URL authentication key indicator or the content URL signature indicator can be used to authenticate a base URL for a DASH MPD, period, adaption set, or representation level. Or, the URL authentication key indicator or the content URL signature indicator can be used to authenticate a segment URL of the MPD.

In another configuration, the transceiver can be further configured to receive the calculated URL signature from the client device. The processor can be further configured to validate the client device with the calculated URL signature. The server can include a web server, a media server, an authentication server, a third generation partnership project (3GPP) long term evolution (LTE) packet switched streaming service (PSS) server, a dynamic adaptive streaming over hypertext transfer protocol (HTTP) (DASH) server, or an integrated multimedia subsystem (IMS) based PSS and multimedia broadcast and multicast service (MBMS) (IMS_PSS_MBMS) server.

Figure 9:
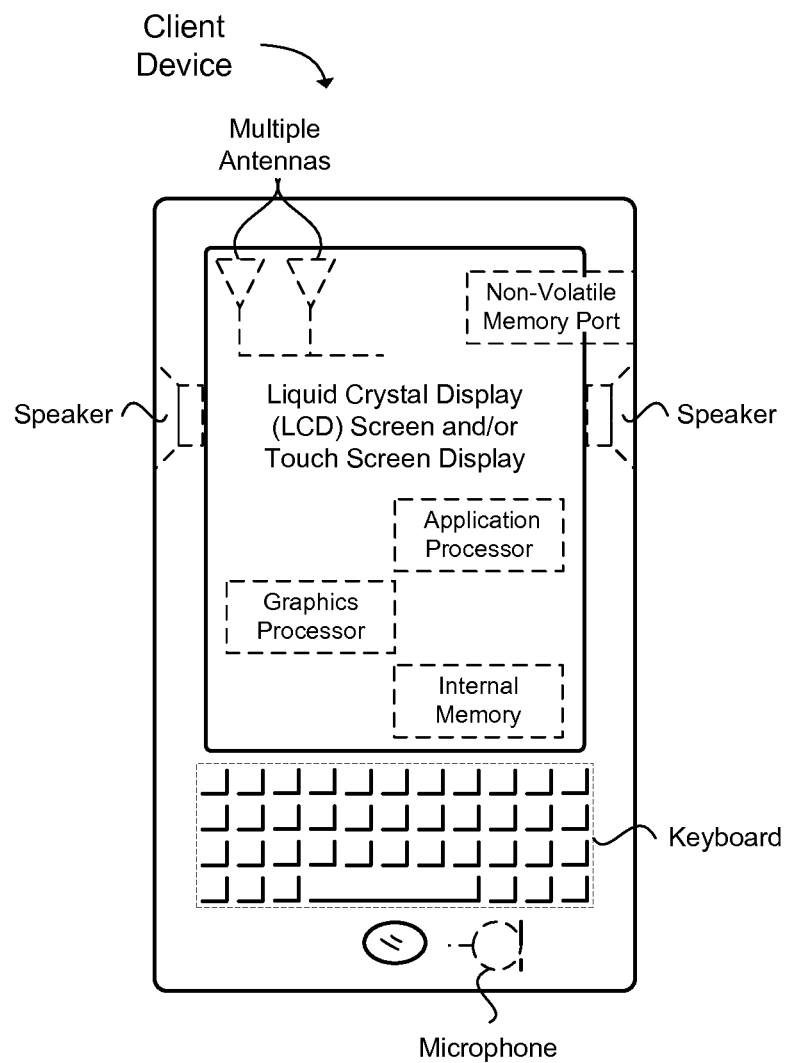
FIG. 9 illustrates a diagram of a wireless device (e.g., UE) in accordance with an example.

FIG. 9 provides an example illustration of the client device, such as a mobile terminal (MT), a mobile node, a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 9 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A client device operable for content uniform resource locator (URL) authentication for dynamic adaptive streaming over hypertext transfer protocol (HTTP) (DASH), having computer circuitry configured to:

receive, at the client device, a URL authentication key indicator and a content URL signature indicator from a server, wherein the URL authentication key indicator contains, at least, a URL authentication key;

generate a calculated URL signature by utilizing the URL authentication key indicator for a URL in a DASH media presentation description (MPD);

request, by the client device, the DASH segment from the server when the calculated URL signature matches the received content URL signature, thereby authenticating a content URL, wherein the received content URL signature is derived at the server from the content URL contained within the DASH segment URL; and receive, in response to the request, the DASH segment associated with the received content URL signature based upon the authenticated content URL.

2. The computer circuitry of claim 1, wherein the computer circuitry configured to receive the URL authentication key indicator and the content URL signature indicator is further configured to:

receive the URL authentication key indicator or the content URL signature indicator via a media presentation description (MPD) metadata file.

3. The computer circuitry of claim 2, wherein the URL authentication key indicator includes a URL authentication key, or the content URL signature indicator includes a content URL signature.

4. The computer circuitry of claim 2, wherein the URL authentication key indicator includes a pointer key URL that points to the URL authentication key, or the content URL signature indicator includes a pointer signature URL that points to the content URL signature, wherein the computer circuitry is further configured to:

obtain the URL authentication key using the pointer key URL; or obtain the content URL signature using the pointer signature URL.

5. The computer circuitry of claim 2, wherein the URL authentication key indicator includes a URL construction rule that provides a template to construct the authentication key URLs, or the content URL signature indicator includes a URL construction rule that provides a template to construct the URLs for the content URL signatures, wherein the computer circuitry is further configured to:

generate the authentication key URLs using the URL construction rule; or generate the URLs for the content URL signatures using the URL construction rule.

6. The computer circuitry of claim 2, wherein a URL Authenticity descriptor is used to declare an authentication framework via the URL authentication key indicator or the content URL signature indicator, wherein the URL Authenticity descriptor includes a URL Digest element or a URL Signature element, wherein the computer circuitry is further configured to:

construct a signature URL using a template from the URL Digest element, and download a content URL signature from the signature URL; or construct an authentication key URL from the URL Signature element, download a URL authentication key from the authentication key URL, construct a signature URL using a template from the URL Signature element, and download a content URL signature from the signature URL.

7. The computer circuitry of claim 2, wherein the URL authentication key indicator or the content URL signature indicator is used to authenticate a base URL for a DASH MPD, period, adaption set, or representation level, or the URL authentication key indicator, or the content URL signature indicator is used to authenticate a segment URL of the MPD.

8. The computer circuitry of claim 2, wherein the URL authentication key indicator or the content URL signature indicator is used to authenticate a DASH playlist, including a plurality of DASH segment URLs, wherein the URL authentication key indicator or the content URL signature indicator is used to authenticate each playlist-specific URL in the DASH playlist.

9. The computer circuitry of claim 2, wherein the URL authentication key indicator or the content URL signature indicator is used to generate a DASH template for a plurality of DASH segment URLs, wherein the URL authentication key indicator or the content URL signature indicator indicates a predefined rule used to authenticate each template-specific URL.

10. The computer circuitry of claim 1, wherein:

the computer circuitry configured to receive a URL authentication key indicator and a content URL signature indicator is further configured to:

receive a media presentation description (MPD) metadata file including the URL authentication key indicator or the content URL signature indicator, wherein the URL authentication key indicator indicates that the URL authentication key is embedded in the DASH segment, or the content URL signature indicator indicates that the content URL signature is embedded in the DASH segment; and the computer circuitry configured to receive the DASH segment is further configured to:

receive the URL authentication key or the content URL signature within the DASH segment.

11. The computer circuitry of claim 1, wherein the computer circuitry configured to receive a URL authentication key indicator and a content URL signature indicator is further configured to:

receive the URL authentication key indicator or the content URL signature indicator via file-level International Organization for Standardization (ISO) base media file format (ISO-BMFF) file box in the DASH segment, wherein the URL authentication key indicator includes a URL authentication key, or the content URL signature indicator includes a content URL signature, wherein the DASH segment includes an initialization segment or a moov box for the ISO-BMFF, or the DASH segment includes a media segment or a moof box for the ISO-BMFF.

12. The computer circuitry of claim 1, wherein the client device includes a mobile terminal (MT), a user equipment (UE), or a mobile station (MS); and the client device includes an antenna, a camera, a touch sensitive display screen, a speaker, a microphone, a graphics processor, an application processor, internal memory, or a non-volatile memory port.

13. A method for providing content uniform resource locator (URL) authentication for dynamic adaptive streaming over hypertext transfer protocol (HTTP) (DASH) at a client device, comprising:

receiving, at a client device, a URL validation key indicator and a content URL signature indicator from a server, wherein the URL validation key indicator contains, at least, a URL validation key;

generating a calculated URL signature by utilizing the URL validation key for a URL in a DASH media presentation description (MPD); and requesting, by the client device, the DASH segment when the DASH segment URL is validated using the calculated URL signature, thereby validating a content URL, wherein the received content URL signature is derived at the server from the content URL contained within the DASH segment URL; and receiving, in response to the request, the DASH segment associated with the content URL signature based upon the content URL.

14. The method of claim 13, wherein receiving the URL validation key indicator further comprises:
  receiving the URL validation key indicator via a media presentation description (MPD) metadata file.

15. The method of claim 14, wherein the URL validation key indicator includes a URL validation key or a content URL signature, wherein validating the DASH segment URL using the calculated URL signature further comprises:
  comparing a server-generated content URL signature with the client device calculated URL signature.

16. The method of claim 14, wherein the URL validation key indicator includes a pointer key URL that points to the URL validation key or a pointer signature URL that points to the content URL signature, and further comprising:
  retrieving the URL validation key using the pointer key URL; or
  retrieving the content URL signature using the pointer signature URL.

17. The method of claim 14, wherein the URL validation key indicator includes a URL construction rule that provides a template to construct the authentication key URLs or a URL construction rule that provides a template to construct the URLs for the content URL signature, and further comprising:
  constructing a validation key URLs using the URL construction rule; or
  constructing the URLs for the content URL signatures using the URL construction rule.

18. The method of claim 14, wherein the URL validation key indicator is used to authenticate a base URL for a DASH MPD, period, adaption set, or representation level, or the URL validation key indicator is used to authenticate a segment URL of the MPD.

19. At least one non-transitory machine readable storage medium comprising a plurality of instructions adapted to be executed to implement the method of claim 13.

20. A server for content uniform resource locator (URL) authentication for dynamic adaptive streaming over hypertext transfer protocol (HTTP) (DASH), comprising:
  a processor device to:
    generate, at the server, a URL authentication key indicator, and a content URL signature indicator for a DASH segment URL, wherein the URL authentication key indicator contains, at least, a URL authentication key such that a client device can generate a calculated URL signature by utilizing the URL authentication key for a URL content in a DASH media presentation description (MPD); and
  a transceiver to:
    transmit the URL authentication key indicator and the content URL signature indicator to the client device;
    receive, at the server, a URL request from the client device for the DASH segment when the client device matches the calculated URL signature with the received content URL signature, thereby authenticating a content URL, wherein the received content URL signature is derived at the server from the content URL contained within the DASH segment URL; and
    transmit, in response to the request, the DASH segment to the client device associated with the content URL signature based upon the authenticated content URL.

21. The server of claim 20, wherein:
  the transceiver is further configured to:
    transmit the URL authentication key indicator and the content URL signature indicator via a media presentation description (MPD) metadata file.

22. The server of claim 21, wherein the URL authentication key indicator includes a URL authentication key, or the content URL signature indicator includes a content URL signature.

23. The server of claim 21, wherein the URL authentication key indicator includes a pointer key URL that points to the URL authentication key, or the content URL signature indicator includes a pointer signature URL that points to the content URL signature, and
  the transceiver is further configured to:
    transmit the URL authentication key when the pointer key URL is received; or
    transmit the content URL signature when the pointer signature URL is received.

24. The server of claim 21, wherein the URL authentication key indicator includes a URL construction rule that provides a template to construct the authentication key URLs, or the content URL signature indicator includes a URL construction rule that provides a template to construct the URLs for the content URL signatures.

25. The server of claim 21, wherein the URL authentication key indicator or the content URL signature indicator is used to authenticate a base URL for a DASH MPD, period, adaption set, or representation level, or the URL authentication key indicator or the content URL signature indicator is used to authenticate a segment URL of the MPD.

26. The server of claim 20, wherein:
  the transceiver is further configured to:
    receive the calculated URL signature from the client device; and
  the processor is further configured to:
    validate the client device with the calculated URL signature.

27. The server of claim 20, wherein the server includes a web server, a media server, an authentication server, a third generation partnership project (3GPP) long term evolution (LTE) packet switched streaming service (PSS) server, a dynamic adaptive streaming over hypertext transfer protocol (HTTP) (DASH) server, or an integrated multimedia subsystem (IMS) based PSS and multimedia broadcast and multicast service (MBMS) (IMS_PSS_MBMS) server.

* * * * *